US012634676B2

(12) United States Patent
Uy et al.

(10) Patent No.: US 12,634,676 B2
(45) Date of Patent: May 19, 2026

(54) METHOD AND SYSTEM FOR SECURITY SERVICE OF END DEVICE PROFILES

(71) Applicant: Verizon Patent and Licensing Inc., Basking Ridge, NJ (US)

(72) Inventors: Warren Hojilla Uy, Randolph, NJ (US); Taussif Khan, Martinsville, NJ (US); Kyung Min Seo, Rochester Hills, MI (US); Axel Hallo de Wolf, Whippany, NJ (US); Alexandre De Melo, Basking Ridge, NJ (US); Kala Narayanan, Piscataway, NJ (US)

(73) Assignee: Verizon Pat nt and Licensing Inc., Basking Ridge, NJ (US)

( * ) Notice: Subject to any disclaimer, the term of this patent is extended or adjusted under 35 U.S.C. 154(b) by 624 days.

(21) Appl. No.: 17/823,658

(22) Filed: Aug. 31, 2022

(65) Prior Publication Data

US 2024/0073673 A1     Feb. 29, 2024

(51) Int. Cl.
| | |
|---|---|
| *H04W 8/18* | (2009.01) |
| *H04W 12/06* | (2021.01) |
| *H04W 60/00* | (2009.01) |

(52) U.S. Cl.
CPC ........... *H04W 8/183* (2013.01); *H04W 12/06* (2013.01); *H04W 60/00* (2013.01)

(58) Field of Classification Search
CPC ..... H04W 8/183; H04W 12/06; H04W 60/00; H04W 12/04; H04W 12/35
See application file for complete search history.

(56) References Cited

U.S. PATENT DOCUMENTS

| | | | | | |
|---|---|---|---|---|---|
| 9,451,098 | B2 * | 9/2016 | Zhu | ..................... | H04M 15/8011 |
| 2006/0003478 | A1 * | 1/2006 | Hongo | ................... | H10D 62/40 |
| | | | | | 438/69 |
| 2006/0276226 | A1 * | 12/2006 | Jiang | ..................... | H04W 8/183 |
| | | | | | 455/433 |
| 2009/0285377 | A1 * | 11/2009 | Sennett | ................. | H04W 76/50 |
| | | | | | 379/201.04 |
| 2013/0130643 | A1 * | 5/2013 | Bacareza | .............. | H04M 15/43 |
| | | | | | 455/406 |
| 2015/0097669 | A1 * | 4/2015 | Li | .......................... | G08B 21/24 |
| | | | | | 455/435.1 |

(Continued)

FOREIGN PATENT DOCUMENTS

| | | | | | |
|---|---|---|---|---|---|
| CN | 100415032 | C | * | 8/2008 | |
| CN | 110972134 | A | * | 4/2020 | ............ H04W 12/76 |

(Continued)

*Primary Examiner* — Yuwen Pan
*Assistant Examiner* — Swati Jain

(57) ABSTRACT

A method, a device, and a non-transitory storage medium are described in which a security service of end device profiles is provided. The service may include obtaining a profile for a card of an end device from a third party device in which the profile includes first and second executables. For example, the first and second executables may each include a subscriber identification module. The first executable may initialize and subsequently perform a switching procedure that enables the second executable to replace the use of the first executable. The first executable may also generate a key that can be used to provision the second executable on the end device.

20 Claims, 8 Drawing Sheets

500

RECEIVE A PROFILE THAT INCLUDES A FIRST USIM AND A SECOND USIM
505

ENABLE THE FIRST USIM
510

PERFORM A SWITCH TO THE SECOND USIM
515

PROVISION THE SECOND USIM BASED ON A KEY GENERATED FROM THE FIRST USIM
520

ACTIVATE AND REGISTER WITH A NETWORK
525

(56)                References Cited

U.S. PATENT DOCUMENTS

| | | | | |
|---|---|---|---|---|
| 2015/0304506 | A1* | 10/2015 | Zhu | H04W 8/205 |
| | | | | 455/406 |
| 2016/0125386 | A1* | 5/2016 | Desai | G06Q 30/0641 |
| | | | | 705/41 |
| 2017/0033823 | A1* | 2/2017 | Smith | H04W 8/18 |
| 2017/0140356 | A1* | 5/2017 | Desai | G06Q 20/322 |
| 2017/0257886 | A1* | 9/2017 | Adjakple | H04W 74/04 |
| 2017/0265059 | A1* | 9/2017 | Wozniak | H04W 60/005 |
| 2019/0215666 | A1* | 7/2019 | Glass | H04W 60/005 |
| 2020/0322884 | A1* | 10/2020 | Di Girolamo | H04W 12/06 |
| 2020/0351653 | A1* | 11/2020 | Khan | H04W 12/35 |
| 2021/0014934 | A1* | 1/2021 | Lovlekar | H04W 4/60 |
| 2021/0120424 | A1* | 4/2021 | Kang | H04L 67/30 |
| 2021/0314148 | A1* | 10/2021 | Yang | H04W 12/43 |
| 2022/0360982 | A1* | 11/2022 | Tsiatsis | H04W 12/40 |
| 2023/0308861 | A1* | 9/2023 | Fan | H04W 12/45 |
| 2023/0328505 | A1* | 10/2023 | Dutta | H04W 4/50 |
| | | | | 455/418 |
| 2023/0396455 | A1* | 12/2023 | Wane | H04L 9/50 |
| 2024/0007848 | A1* | 1/2024 | Chaugule | H04W 8/265 |
| 2024/0129139 | A1* | 4/2024 | Dietrich | H04L 9/3231 |
| 2024/0306088 | A1* | 9/2024 | Russell | H04L 65/1073 |
| 2024/0314559 | A1* | 9/2024 | Gundavelli | H04W 12/0433 |

FOREIGN PATENT DOCUMENTS

| | | | | | |
|---|---|---|---|---|---|
| EP | | 3040922 | A1 * | 7/2016 | G06Q 20/3229 |
| WO | WO-2018107723 | A1 * | 6/2018 | | |
| WO | WO-2023233353 | A1 * | 12/2023 | | H04L 9/50 |

* cited by examiner

500

RECEIVE A PROFILE THAT INCLUDES A FIRST USIM AND A SECOND
USIM
505

ENABLE THE FIRST USIM
510

PERFORM A SWITCH TO THE SECOND USIM
515

PROVISION THE SECOND USIM BASED ON A KEY GENERATED FROM
THE FIRST USIM
520

ACTIVATE AND REGISTER WITH A NETWORK
525

600

METHOD AND SYSTEM FOR SECURITY SERVICE OF END DEVICE PROFILES

BACKGROUND

Service providers, network providers, and other types of entities may manage the allocation and assignment of subscriber identification module (SIM) cards and/or other types of cards to end devices for use in accessing various networks and application services.

DETAILED DESCRIPTION

Figure 1:
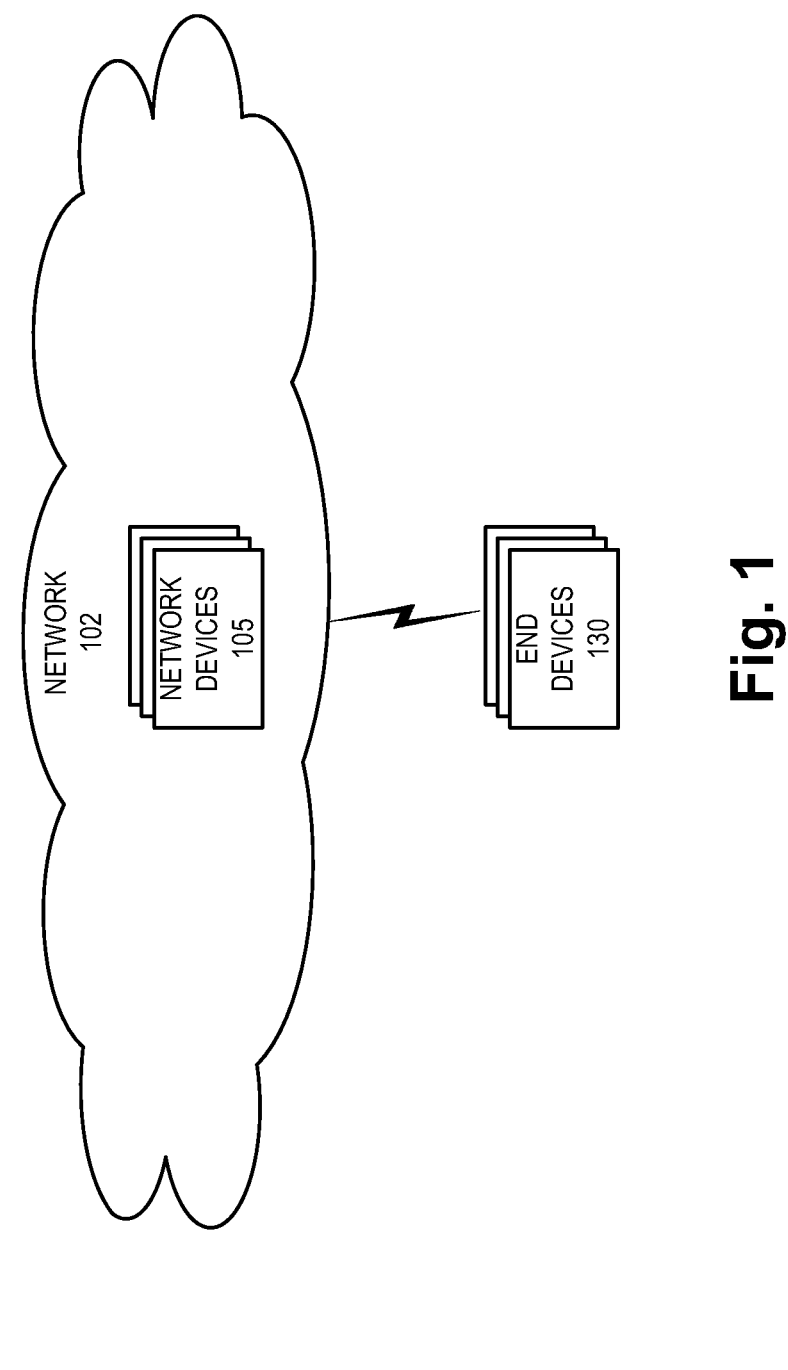
FIG. 1 is a diagram illustrating an exemplary environment in which an exemplary embodiment of a security service of end device profiles may be implemented.

The following detailed description refers to the accompanying drawings. The same reference numbers in different drawings may identify the same or similar elements. Also, the following detailed description does not limit the invention.

A service provider, a network provider, a network operator, a wireless carrier, or another type of entity may have to manage various aspects of end devices that support the provisioning of wireless access to various networks and application services. For example, the entity may have to acquire, assign, distribute, and/or manage SIMs, embedded SIMS (eSIMs), Universal SIMS (USIMs), integrated SIMS (iSIMs), and/or a similar type of application, software, and/or executable (referred to herein as simply a USIM) that may be used by various types of end devices to enable the end devices to access a network, among other things. A card may relate to a SIM card, an eSIM card/chip, a Universal Integrated Circuit Card (UICC), an embedded UICC, a secure element (SE), an integrated trusted execution environment (TEE), a chip or the like, and may include various types of data, an application, software, an operating system (OS), and/or other types of executables that may be stored on and executed by the card, for example. After provisioning, the card may host a profile, which may include subscription data, security authentication and ciphering information, network configuration information (e.g., roaming files/configuration, etc.), applications (e.g., USIM, etc.), algorithms (e.g., encryption, decryption, etc.), and so forth.

The entity may use a third party system to manage the binding and downloading of profiles to the end devices. The profiles may include, among other things, network keys, credentials, and other sensitive information relating to a network associated with the entity. As a consequence, there are various security exposures in relation to the profiles and use of the third party system that could negatively impact (e.g., potentially compromise) the end devices and/or the network.

According to exemplary embodiments, a security service of end device profiles is described. According to an exemplary embodiment, the security service of end device profiles may include switching from one USIM (e.g., a first USIM) to another USIM (e.g., a second USIM). According to an exemplary embodiment, the first USIM and/or the second USIM may include an applet or another type of program, script, software, or executable file that includes logic of the security service, as described herein. According to an exemplary embodiment, the first USIM may access and use a preloaded key and/or generate a key that may be used to provision the second USIM, as described herein. According to another exemplary embodiment, the first USIM may receive a key from an untrusted third party device. According to various exemplary embodiments, the first USIM and the second USIM may be hosted on a single card, or multiple cards may be implemented.

According to various exemplary embodiments, the security service of end device profiles may include use of a symmetric key and/or an asymmetric key/certificate. According to various exemplary embodiments, the security service of end device profiles may include pre-loading of a key (e.g., as a part of a manufacturing process) and/or generating the key during provisioning.

According to some exemplary embodiments, a security key may be preloaded (e.g., as a part of a manufacturing process) to the card (e.g., a SIM card, a UICC, or the like). In this way, a dependency on a network device to store and transmit the security key to an end device and/or the first USIM may be omitted from an activation process. For example, the first USIM may derive a decryption key based on the security key, an algorithm stored by the card and/or included in the first USIM, and a unique parameter pertaining to the card and/or the first USIM (e.g., an Integrated Circuit Card Identifier (ICCID), an International Mobile Subscriber Identity (IMSI), a Subscription Permanent Identifier (SUPI), a Subscription Concealed Identifier (SUCI), a unique application identifier for the USIM, and/or the like). The security key may be used to provision the second USIM, for example.

According to other exemplary embodiments, the security key may not be preloaded but obtained from a network device, such as an over-the-air (OTA) server or similar provisioning network device for cards and USIMs, for example.

According to an exemplary embodiment, after the updating, the security service of end device profiles may enable the end device to connect to the network and complete an activation process based on the permanent keyset. The end device may also register with the network.

In view of the foregoing, the security service of end device profiles may significantly reduce or even eliminate security exposures associated with the provisioning of end device profiles on a third party subscription management system. For example, the security service of end device profiles may include a switching and provision services relative to first and second USIMs, as described herein. The security service may allow the end devices to execute an activation process in a manner that protects network information of an entity, such as a network operator, despite the use of a third party subscription management system, as well as maintain a secure environment for the end devices and the network during the activation process and initial connectivity procedure with a network, such as a core network.

FIG. 1 is a diagram illustrating an exemplary environment 100 in which an exemplary embodiment of a security service of end device profiles may be implemented. As illustrated, environment 100 may include a network 102. Network 102 may include network devices 105. Additionally, as illustrated, environment 100 may include end devices 130 (also referred to individually or generally as end device 130).

The number, type, and arrangement of networks illustrated and described in environment 100 are exemplary. For example, according to other exemplary embodiments, environment 100 may include fewer networks, additional networks, and/or different networks.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices illustrated and described are exemplary. For purposes of description, an end device is not considered a network device.

Environment 100 includes communication links between the network devices and between end devices and a network. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated and described in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a Fifth Generation (5G) interface, another generation of interface (e.g., 5.5G, Sixth Generation (6G), Seventh Generation (7G), etc.), or some other type of interface (e.g., proprietary, etc.).

Referring to FIG. 1, network 102 may include one or multiple types of networks of one or multiple types of technologies. Network 102 may be implemented to include a cloud network, a private network, a public network, the Internet, a packet data network (PDN), a service provider network, a data center, a radio access network (RAN), a core network, and/or another type of network that may provide access to and may provide a subscription management service. The subscription management service may include the provisioning of cards to end devices 130. The subscription management service may include an exemplary embodiment of the security service of end device profiles, as described herein.

According to an exemplary embodiment, network 102 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology.

Depending on the implementation, network 102 may include multiple types of network devices, such as network devices 105. For example, network devices 105 may include a network device that allocates end device profiles to distribution devices. According to an exemplary embodiment, network devices 105 include a third party distribution device. According to various exemplary embodiments of the security service of end device profiles, the third party distribution device may be provisioned with end device profiles in which each end device profile includes multiple USIMs, as described herein.

Network devices 105 may include an over-the-air (OTA) server or similar functioning network device that facilitates the provisioning and activation of end devices 130, as described herein. For example, according to various exemplary embodiments, the OTA server may provide and/or update end devices 130 with USIMs that include logic of an exemplary embodiment of the security service of end device profiles, as described herein.

Additionally, network devices 105 may include various network devices of a radio access network. For example, the radio access network may be implemented to include a Fifth Generation (5G) RAN, a future generation RAN (e.g., a 5.5 RAN, a Sixth Generation (6G) RAN, a Seventh Generation (7G) RAN, or a subsequent generation RAN), a centralized-RAN (C-RAN), an Open Radio Access Network (O-RAN), and/or another type of access network (e.g., a Fourth Generation (4G) RAN, a 4.5G RAN, etc.). By way of further example, network devices 105 may include a next generation Node B (gNB), an evolved LTE (eLTE) evolved Node B (eNB), an eNB, a radio network controller (RNC), a remote radio head (RRH), a baseband unit (BBU), a radio unit (RU), a remote radio unit (RRU), a centralized unit (CU), a distributed unit (DU), a 5G ultra-wide band (UWB) node, a future generation wireless access device (e.g., a 6G wireless station, a 7G wireless station, or another generation of wireless station), and/or the like. The network device(s) of the radio access network may support communication and connectivity between end device 130 and other network devices 105 of network 102 and the security service of end device profiles, as described herein.

Further, network devices 105 may include network devices of a core network. The core network may include a complementary network of the radio access network. For example, the core network may be implemented to include a 5G core network, an evolved packet core (EPC) of a Long Term Evolution (LTE) network, an LTE-Advanced (LTE-A) network, and/or an LTE-A Pro network, a future generation core network (e.g., a 5.5G, a 6G, a 7G, or another generation of core network), and/or another type of core network. Depending on the implementation of the core network, the core network may include diverse types of network devices, such as a user plane function (UPF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network exposure function (NEF), a mobility management entity (MME), a packet gateway (PGW), a serving gateway (SGW), a home subscriber server (HSS), an authentication, authorization, and accounting (AAA) server, a policy and charging rules function (PCRF), a policy and charging enforcement function (PCEF), a Short Message Service Center (SMSC), a Short Message Peer-to-Peer (SMPP) gateway, a charging system (CS), and/or another type of network device that may be well-known but not particularly mentioned herein.

According to various exemplary embodiments of the security service of end device profiles, the network device(s) of the core network may facilitate the provisioning and activation of the end device profiles/cards associated end device 130 and network 102. For example, the network device(s) may authenticate end device 130 and/or a USIM and facilitate provisioning and switching procedures, as described herein.

End device 130 device may include a device that has communication capabilities and computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, etc.), a computer, a gaming device, a music device, an Internet of Things (IoT) device, a drone, a smart device, a vehicular telematics unit, or other type of wireless device (e.g., other type of user equipment (UE)). End device 130 may be configured to execute various types of software (e.g., applications, programs, etc.). The number and the types of software may vary among the end devices 130. According to an exemplary embodiment, end device 130 may operate and connect to network 102 based on a card or chip and an end device profile that includes logic of the security service of end device profiles, as described herein. End device 130 may include system software, modem logic, and/or other types of applications that may communicate with a card, a USIM, and so forth, as described herein.

End device 130 may support one or multiple radio access technologies (RATs) (e.g., 4G, 5G, and/or future generation RAT) and various portions of the radio spectrum (e.g., multiple radio frequency (RF) bands, multiple carrier frequencies, licensed, unlicensed, millimeter (mm) wave, above mm wave, centimeter (cm) wave, etc.), various levels and genres of network slicing, dual connectivity (DC) service, carrier aggregation (CA) service, and/or other types of connectivity services.

Figure 2A:
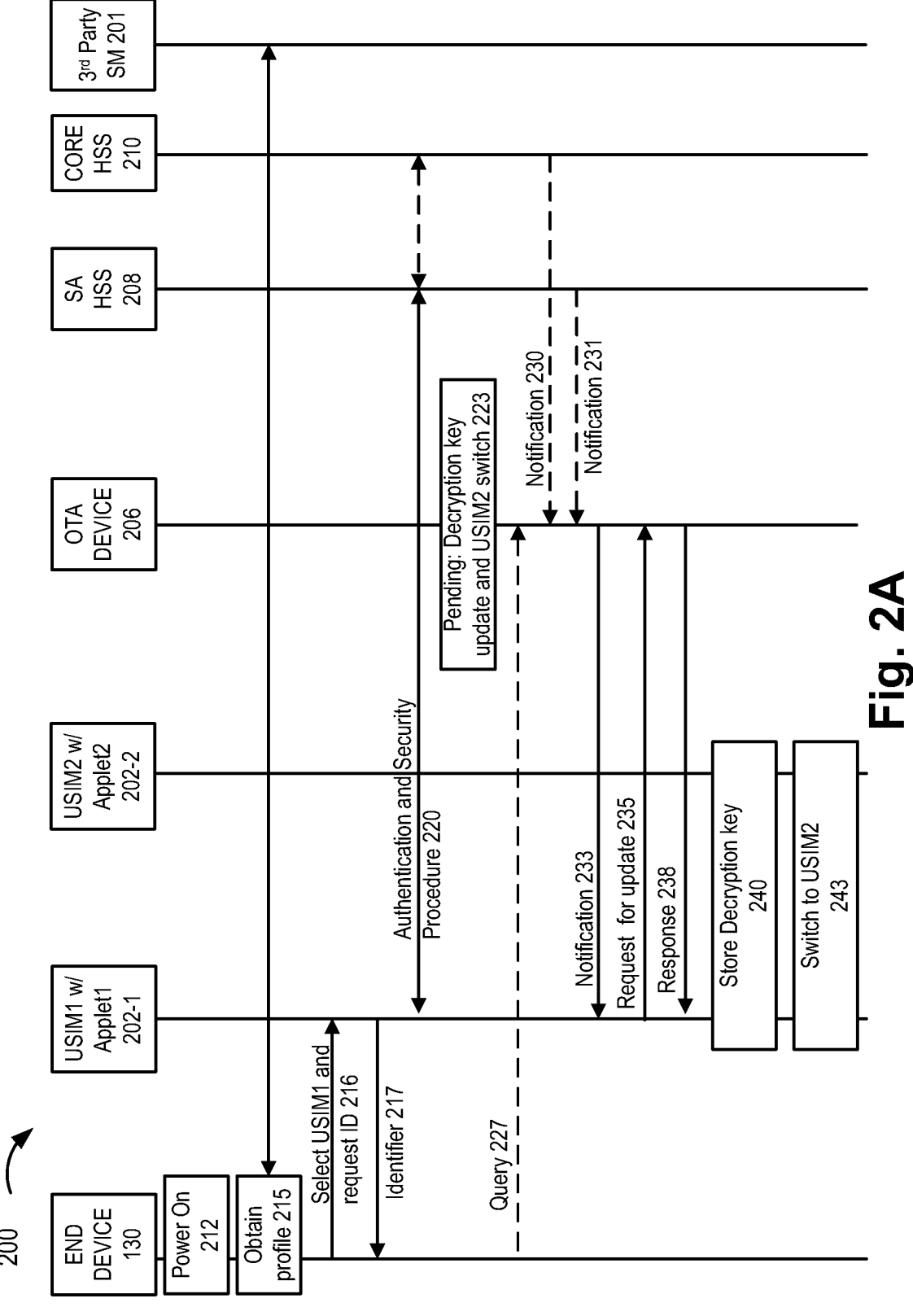
FIGS. 2A and 2B are diagrams illustrating an exemplary process of an exemplary embodiment of the security service of end device profiles.
Figure 2B:
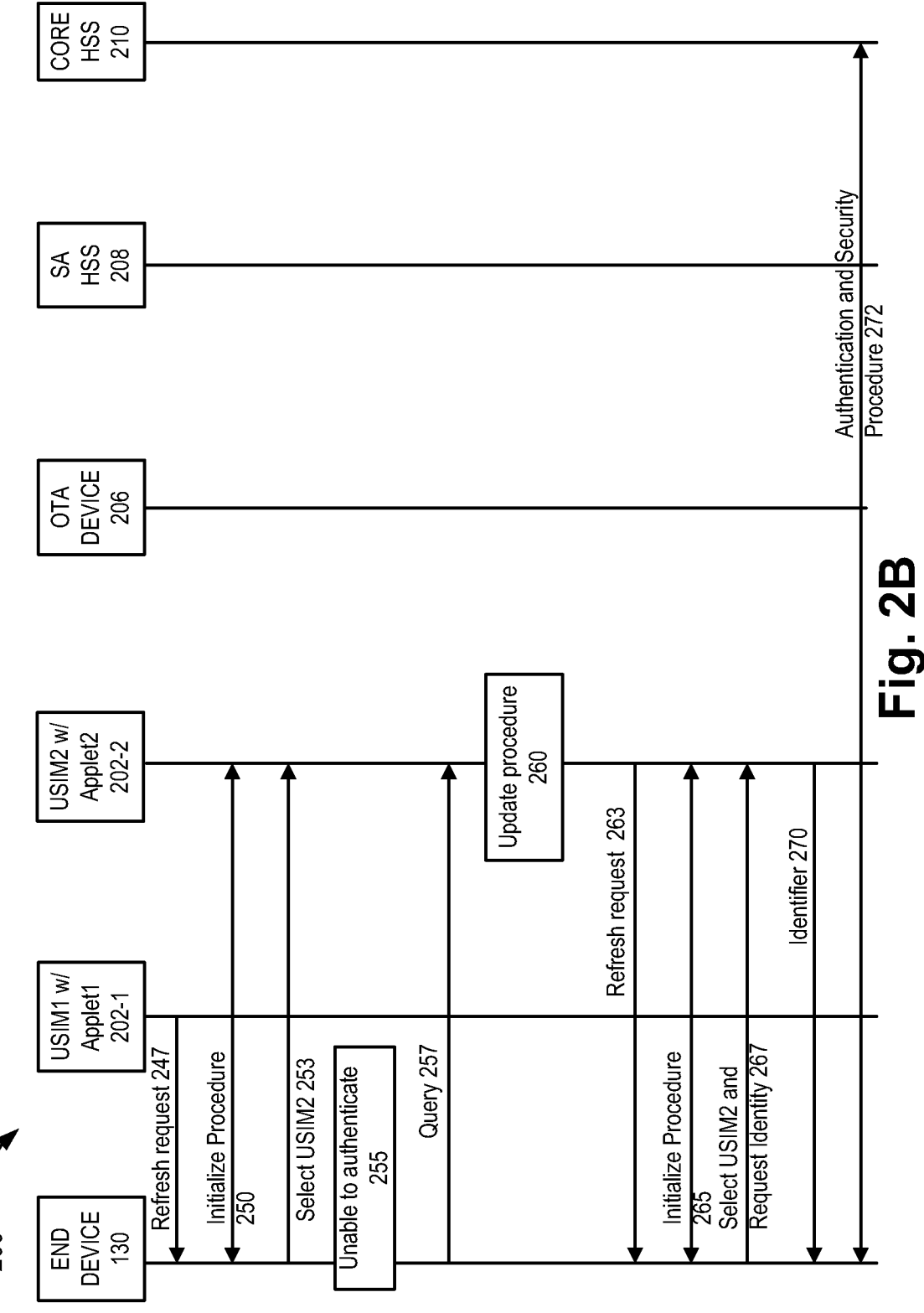

FIGS. 2A and 2B are diagrams illustrating an exemplary process of an exemplary embodiment of the security service of end device profiles. The exemplary environment, in which process 200 may be implemented, may include end device 130, a third party subscription management (SM) device 201, a USIM1 with an applet1-202-1 and a USIM2 with an applet2 202-2 (also referred to collectively as USIMs with applets 202 and individually or generally as USIM with applet 202), an OTA device 206, a self-activation (SA) HSS 208, and a core HSS 210. According to other embodiments, additional, different, and/or fewer network devices may be used to perform an exemplary embodiment of the security service of end device profiles. For example, according to some exemplary embodiments, SA HSS 208 may be omitted. Also, an access network and access devices (e.g., a RAN, a RAN device, etc.) have been omitted for the sake of brevity.

Third party subscription management device 201 may include a network device that may facilitate the downloading of suitable end device profiles, as described herein, to end devices 130. For example, third party subscription management device 201 may receive a request from end device 130 for an end device profile or from a business entity device to provide the profile to end device 130. Third party subscription management device 201 may be implemented as a single or a multi-vendor distribution platform system that includes distribution of end device profiles to end devices 130. Third party subscription management device 201 may store and associate network-related information, such as IMSIs, SUPIs, or the like, with other identifiers, such as ICCIDs or another type of globally unique identifier that identifies each end device profile.

OTA device 206 may include a network device that provides a function or a service of an exemplary embodiment of the security service of end device profiles. OTA device 206 may select and download multiple USIMs, which include logic of the security service of end device profiles, as described herein, for end device 130. According to some exemplary embodiments, OTA device 206 may include providing a security key to end device 130. OTA device 206 may be implemented as an OTA server, such as a SIM OTA server, a device management (DM) server, or another type of card OTA server. OTA device 206 may activate a profile based on a communication from end device 130 indicating that the profile has been successfully installed.

SA HSS 208 may include a network device which includes logic that provides a function or a service of an exemplary embodiment of the security service of end device profiles. For example, SA HSS 208 may authenticate and/or authorize end device 130/USIMs, as described herein. According to various exemplary embodiments, SA HSS 208 may be implemented to include an HSS, a UDM, a UDR, and/or a similar network device. SA HSS 208 may perform a security procedure based on a keyset associated with end device 130. According to some exemplary embodiments, SA HSS 208 may be implemented as a dedicated HSS, UDM, and/or UDR pertaining to end device 130, card, and/or end device profile activation, unlike core HSS 210.

Core HSS 210 may include a network device which includes logic that provides a function or a service of an exemplary embodiment of the security service of end device profiles. For example, core HSS 210 may authenticate and/or authorize end device 130 when end device 130 has an end device profile including USIMs with security service logic, as described herein. According to various exemplary embodiments, core HSS 210 may be implemented to include an HSS, a UDM, a UDR, and/or a similar network device that may store subscription data relating to end devices 130. Although not illustrated, core HSS 210 may include other core network devices, such as an MME, an AMF, and/or other core devices, as described herein.

End device 130 may include a device which includes logic that provides a function or a service of an exemplary embodiment of the security service of end device profiles. For example, end device 130 may include a physical card, chip, or the like and an end device profile that includes logic that provides a function or a process of an exemplary embodiment of the security service of end device profiles. The physical card or chip may include a processor and a memory and/or storage. End device 130 may be configured to download a profile from third party subscription management device 201. For example, end device 130 may include a bootstrap profile that affords end device 130 minimal or limited access to network 102 and allows end device 130 to communicate with a provisioning system.

Based on the installation of the profile on the card, according to various exemplary embodiments of the security service of end device profiles, the card and the profile may be configured to perform a security procedure with SA HSS 208, core HSS 210, or both, perform security and switching procedures relating to the USIMs, and perform activation and registration procedures, as described herein.

Referring to FIG. 2A of an exemplary process 200, according to an exemplary embodiment, process 200 may include end device 130 powering on 212, and in response thereto end device 130 and/or a card of end device 130 may initiate a download of the profile with third party subscription management device 201 and obtain the profile 215. For example, although not illustrated, end device 130 and/or the card may transmit a request, which may include a request for a profile, and third party subscription management device 201 may select an appropriate profile, and provide a response that includes the profile. The profile may include multiple USIMs, such as USIMs with applets 202, and operator subscription data, for example.

Based on completion of the downloading, end device 130 may select USIM1 with applet 202-1 and request an identifier 216 from USIM1 202-1. In response, USIM1 202-1 may provide an identifier 217 to end device 130. For example, the identifier may be an IMSI, a SUPI, a subscription concealed identifier (SUCI), or another type of unique identifier pertaining to USIM1 202-1. It should be noted that USIM1 202-1 and USIM 202-2 may have separate and distinct identifiers.

As further illustrated, USIM1 202-1 may initiate, via end device 130, an authentication and security procedure 220 with SA HSS 208. The card and the profile (referred to herein as "card logic") may be configured to connect with SA HSS 208. As illustrated, after a connection is established, the card logic and SA HSS 208 may perform an authentication procedure 220. For example, USIM1 202-1 may be authenticated based on the identifier. USIM1 202-1 may include a key for authentication. Authentication and security procedure 220 may also include provisioning control plane security, user plane security, among other things, for example. Upon successful completion of the authentication and security procedure 220, SA HSS 208 and core HSS 210 may communicate (illustrated as unlabeled dashed arrows) to indicate successful completion of the procedure.

According to this exemplary embodiment, OTA device 206 may be configured to provide a decryption key update and trigger a USIM2 switching procedure 223. As illustrated, the update procedure may be triggered in multiple ways. As illustrated, according to an exemplary embodiment, end device 130 and/or USIM1 202-1 may transmit a query message 227 to OTA device 206. Query message 227 may query for or request an update. In response to receiving query message 227, OTA device 206 may determine whether the update is provisioned for the card of end device 130 and/or whether OTA device 206 has received notification that the authentication and security procedure has been successfully completed. End device 130 and/or USIM1 202-1 may be configured to transmit one or multiple query messages 227 based on a configured timer, for example. In between query messages 227, USIM1 202-1 may enter an idle state. According to another exemplary embodiment, core HSS 210 may generate and transmit a notification 230. For example, core HSS 210 may transmit notification 230 in response to receiving an indication from SA HSS 208 that the authentication and security procedure has been successfully completed in relation to end device 130, USIM1 202-1, and/or the card of end device 130 (e.g., associated with an ICCID). According to yet another exemplary embodiment, SA HSS 208 may generate and transmit a notification 231 to OTA device 206 in response to successfully completing the authentication and security procedure.

As further illustrated, in response to receiving query 227, notification 230, and/or notification 231, OTA device 206 may generate and transmit a notification 233 to USIM1 202-1. Notification 233 may cause USIM1 202-1 to wake-up from the idle state. In response, USIM1 202-1 may generate and transmit a request for update 235. The request may include the ICCID and/or other identifiers, as described herein. In response to receiving the request for update, OTA device 206 may perform a lookup based on the identifier(s), generate, and transmit a response 238. For example, the response may include a decryption key, a request for applet1 of USIM1 202-1 to provision USIM2 202-2, and perform a switching procedure (e.g., switch use of USIM1 202-1 to USIM2 202-2). Communication between USIM1 202-1 and OTA device 206 may be provisioned via a secure channel (e.g., a secure channel protocol (SCP) channel)

In response to receiving the response from OTA device 206, USIM1 202-1 may store the decryption key 240 with USIM2 202-2. For example, the decryption key may be stored in a secure file or a secure JAVA object file of USIM2 202-2. Additionally, USIM1 202-1 may perform a switching procedure 243. For example, USIM1 202-1 may change an order of application identifiers (AIDs), which may be stored in an electronic file directory or another suitable file that may include an application identifier of USIM1 202-1 and an application identifier of USIM2 202-2. Alternatively, for example, USIM1 202-1 may disable its own AID or delete its own AID from the directory or another type of file.

Referring to FIG. 2B, with respect to exemplary process 200, USIM1 202-1 may generate and transmit a refresh request 247 to end device 130. In response, end device 130 may perform an initialization procedure 250 with USIM2 202-2 in which the USIM2 information is initialized, and thereafter may select USIM2 202-2 for use 253. Based on the selection, end device 130 may attempt to perform network authentication (e.g., with an authentication device, such as SA HSS 208, an AMF, an MME, etc.) using USIM2-202-2 but the network authentication may be unsuccessful. Based on determining that network authentication cannot be completed 255, end device 130 may generate and transmit one or multiple status or trigger messages 257 to USIM2 202-2 to determine a status of or trigger an update procedure to be performed by USIM2 202-2. As illustrated, USIM2 202-2 may perform an update procedure 260. The update procedure may include decrypting encrypted data in applet2 using the decryption key and configuring appropriate electronic files (e.g., credential files, security key, etc.) to enable a successful authentication procedure. Upon completion of the update procedure, USIM2 202-2 may generate and transmit a refresh request 263 to end device 130.

In response thereto, end device 130 and USIM2 202-2 may perform an initialization procedure 265 in which end device 130 may initialize with USIM2 information. After initialization, end device 130 may select USIM2 202-2 for use and request an identifier 267. USIM2 202-2 may provide an identifier 270 to end device 130, such as an IMSI, a SUPI, a SUCI, or another unique identifier pertaining to USIM2 202-2. As further illustrated, end device 130 with use of USIM2 202-2 may perform an authentication and security procedure 272 with core HSS 210, for example.

Figure 3A:
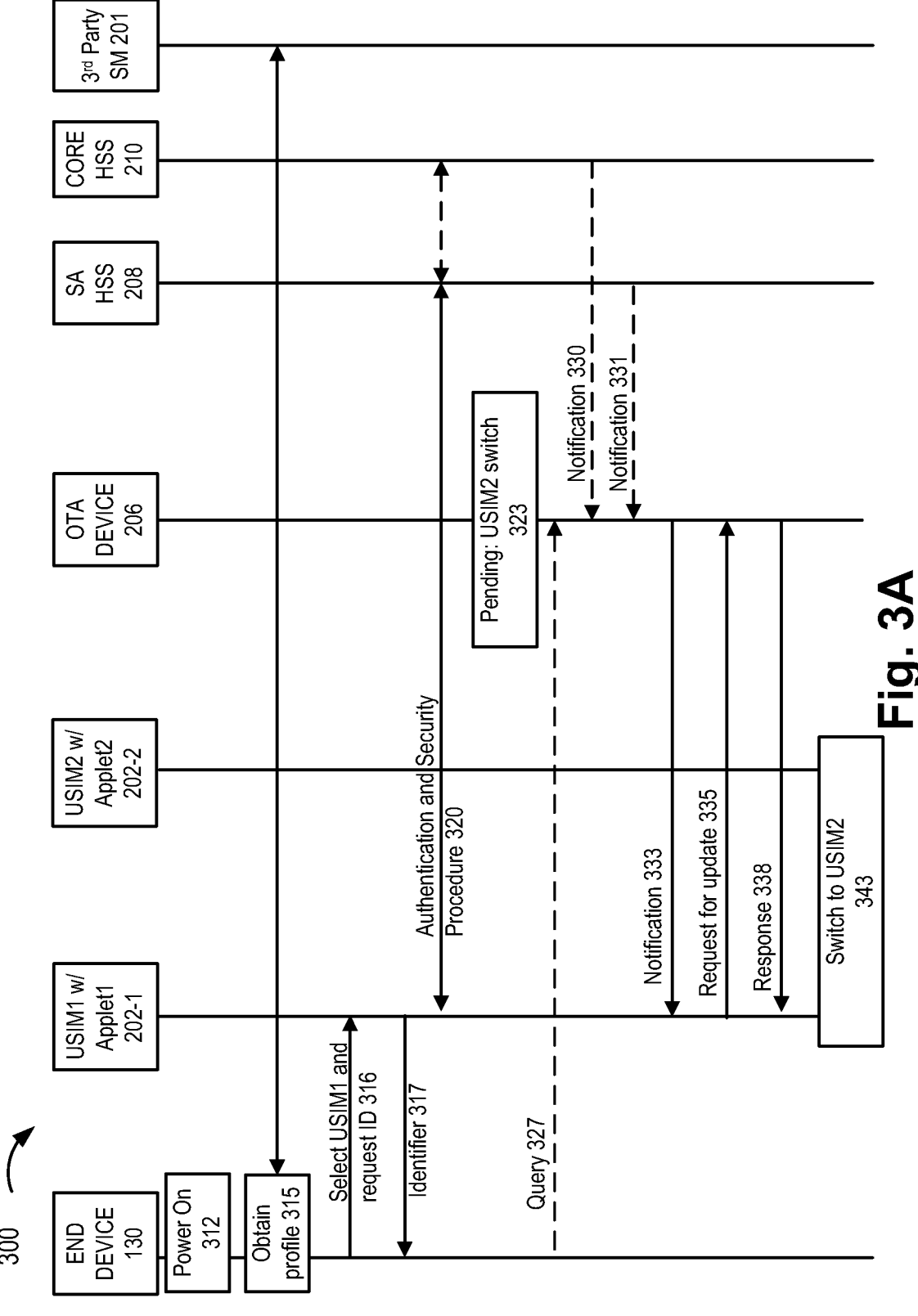
FIGS. 3A and 3B are diagrams illustrating another exemplary process of an exemplary embodiment of the security service of end device profiles.
Figure 3B:
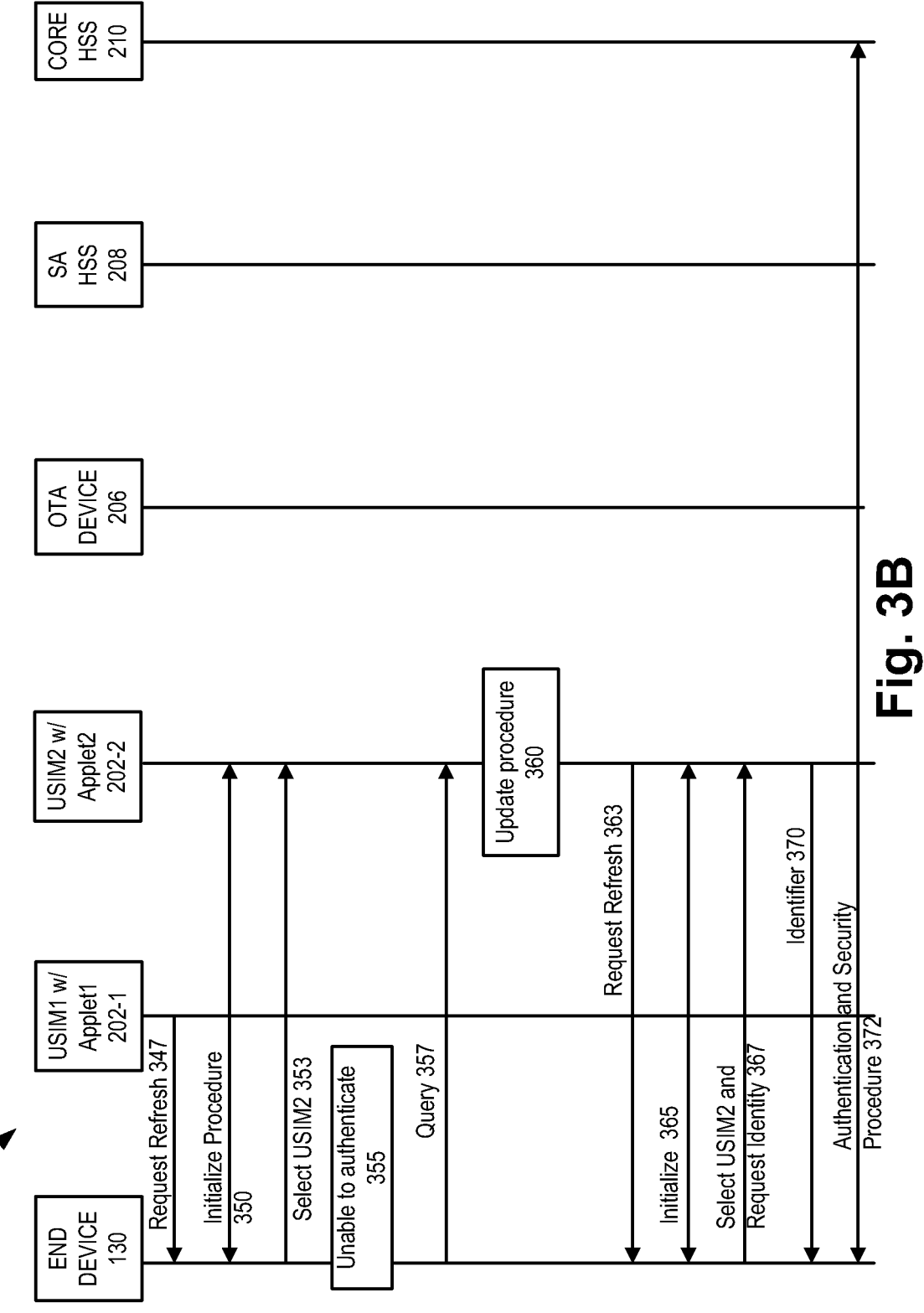

FIGS. 3A and 3B are diagrams illustrating another exemplary process 300 of an exemplary embodiment of the security service of end device profiles. The exemplary environment, in which process 300 may be implemented, may include devices similar to that described in relation to process 200.

Referring to FIG. 3A, process 300 may include end device 130 powering on 312, obtaining a profile 315 from third party subscription management device 201, selecting USIM1 and requesting an identifier 316, being provided an identifier 317 and performing an authentication and security procedure 320. These steps may be performed in a manner similar to their corresponding steps of process 200, and will not be described again for the sake of brevity. Upon successful completion of the authentication and security procedure 320, SA HSS 208 and core HSS 210 may communicate (illustrated as unlabeled dashed arrows) to indicate successful completion of the procedure.

According to an exemplary embodiment, unlike OTA device 206 of process 200, OTA device 206 may not be configured to provide a decryption key update, but may provide a trigger for a USIM2 switching procedure 323. As described, the card may generate or derive a decryption key based on key generation algorithm. For example, the key generation algorithm may be proprietary (e.g., associated with a network operator) or may include a known key generation algorithm. The key generation algorithm may use the ICCID of the card and/or other identifiers (e.g., associated with USIM1, USIM2, etc.) to generate the key.

As further illustrated in FIG. 3A, similar to process 200, a query message 327, a notification 330, and/or a notification message 331 may be transmitted to OTA device 206 for triggering an update procedure. Additionally, similar to process 200, a notification 333, a request for update 335, and a response 338 may be communicated. However, unlike process 200, the response may not include the decryption key because the decryption key may be locally generated at end device 130. The decryption key may be stored in a secure file or a secure JAVA object file of USIM2 202-2. USIM1 202-1 may perform a switching procedure 343. For example, USIM1 202-1 may change an order of AIDs, which may be stored in an electronic file directory or another suitable file that may include an application identifier of USIM1 202-1 and an application identifier of USIM2 202-2. Alternatively, for example, USIM1 202-1 may disable its own AID or delete its own AID from the directory or another type of file.

Referring to FIG. 3B, with respect to exemplary process 300, USIM1 202-1 may generate and transmit a refresh request 347 to end device 130. In response, end device 130 may perform an initialization procedure 350 with USIM2 202-2 in which the USIM2 information is initialized, and thereafter may select USIM2 202-2 for use 353. Based on the selection, end device 130 may attempt to perform network authentication (e.g., with an authentication device, such as SA HSS 208, an AMF, an MME, etc.) using USIM2-202-2 but the network authentication may be unsuccessful. Based on determining that network authentication cannot be completed 355, end device 130 may generate and transmit one or multiple status or trigger messages 357 to USIM2 202-2 to determine a status of or trigger an update procedure to be performed by USIM2 202-2. As illustrated, USIM2 202-2 may perform an update procedure 360. The update procedure may include decrypting encrypted data in applet2 using the decryption key and configuring appropriate electronic files (e.g., credential files, security key, etc.) to enable a successful authentication procedure. Upon completion of the update procedure, USIM2 202-2 may generate and transmit a refresh request 363 to end device 130.

In response thereto, end device 130 and USIM2 202-2 may perform an initialization procedure 365 in which end device 130 may initialize with USIM2 information. After initialization, end device 130 may select USIM2 202-2 for use and request an identifier 367. USIM2 202-2 may provide an identifier 370 to end device 130, such as an IMSI, a SUPI, a SUCI, or another unique identifier pertaining to USIM2 202-2. As further illustrated, end device 130 with use of USIM2 202-2 may perform an authentication and security procedure 372 with core HSS 210, for example.

FIGS. 2A, 2B, 3A and 3B illustrate and describe exemplary processes of exemplary embodiments of the security service of end device profiles, however according to other exemplary embodiments, the security service of end device profiles may include additional, different and/or fewer operations relative to those illustrated and described. The messages illustrated and described are exemplary.

Figure 4:
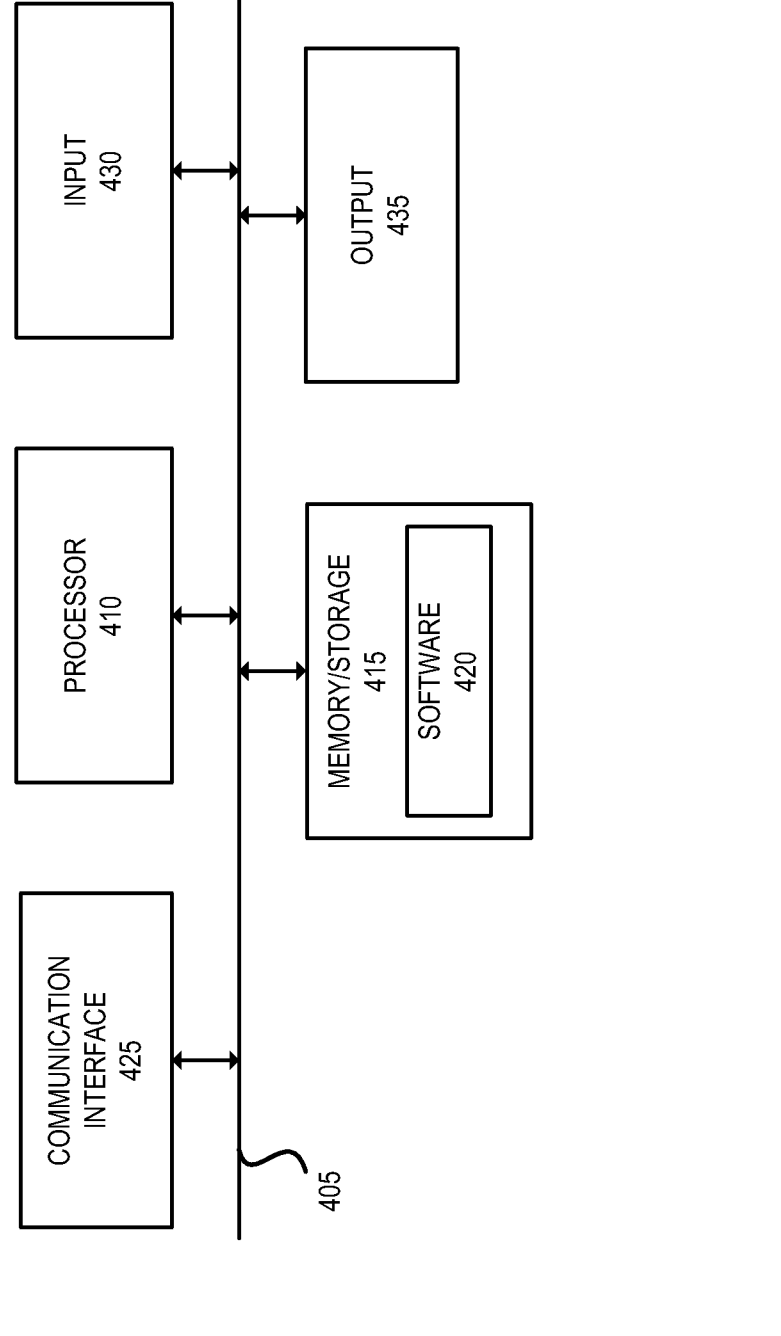
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to network devices 105, end device 130, a card or the like of end device 130, third party subscriber management device 201, OTA device 206, SA HSS 208, core HSS 210, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/ storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to a card or a chip of end device 130, as described herein, software 420 may include an application that, when executed by processor 410, provides a function and/or a process of security service of end device profiles, as described herein. Additionally, with reference to OTA device 206, SA HSS 208, and/or core HSS 210, software 420 may include an application that, when executed by processor 410, provides a function and/or a process of security service of end device profiles, as described herein. Software 420 may also include firmware, middleware, microcode, hardware description language (HDL), and/or another form of an executable (e.g., applet, script, or the like). Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies. For example, network devices 105 and/or end device 130, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
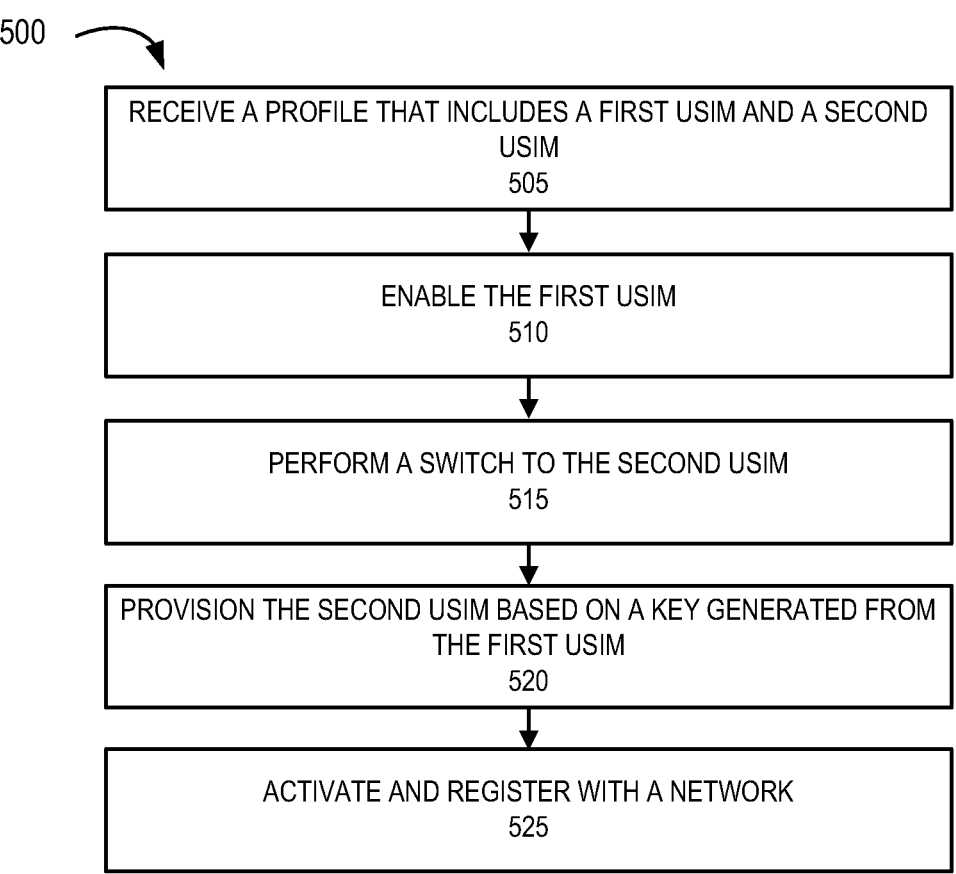
FIG. 5 is a flow diagram illustrating an exemplary process of an exemplary embodiment of the security service of end device profiles.

FIG. 5 is a flow diagram illustrating an exemplary process 500 of an exemplary embodiment of the security service of end device profiles. According to an exemplary embodiment, end device 130 and/or card logic may perform a step of process 500. According to an exemplary implementation, processor 410 executes software 420 to perform the step of process 500, as described herein. Alternatively, the step may be performed by execution of only hardware. In this way, end device 130 and/or the card logic may be configured to perform a step of process 500.

Referring to FIG. 5, in block 505, end device 130 may obtain a profile that includes a first USIM and a second USIM. For example, end device 130 may download the profile, which includes a first executable element, such as the first USIM or the like, and a second executable element, such as the second USIM or the like, as described herein, from a third party device, such as third party subscription management device 201. The profile includes other elements, such as subscription management information, and so forth.

In block 510, the card logic of end device 130, as described herein, may install or enable the first USIM. For example, end device 130 may select the first USIM for use and obtain an identifier from the first USIM, as described herein. The first USIM may perform an authentication and security procedure. In block 515, the card logic may perform a switching procedure to the second USIM. For example, the first USIM may update (e.g., change the order, disable, delete) an AID of the first USIM, and enable the second USIM for prospective selection and use by end device 130.

In block 520, the card logic may provision the second USIM based on a key generated from the first USIM. For example, the card logic may generate the key based on an identifier of the card and/or another type of identifier, as described herein. The key may include a decryption key, for example. The first USIM may provision or make available the key to the second USIM and enable the second USIM to decrypt encrypted data and perform provisioning.

In block 525, the card logic may be activated and register with a network. For example, end device 130 may select and use the second USIM. The second USIM of end device 130 may be activated or register with network 102, which may include a core network.

FIG. 5 illustrates an exemplary embodiment of a process of the security service of end device profiles, according to other exemplary embodiments, the security service of end device profiles may perform additional operations, fewer operations, and/or different operations than those illustrated and described. For example, one or multiple steps illustrated and described in relation to FIGS. 3A and 3B may be performed.

Figure 6:
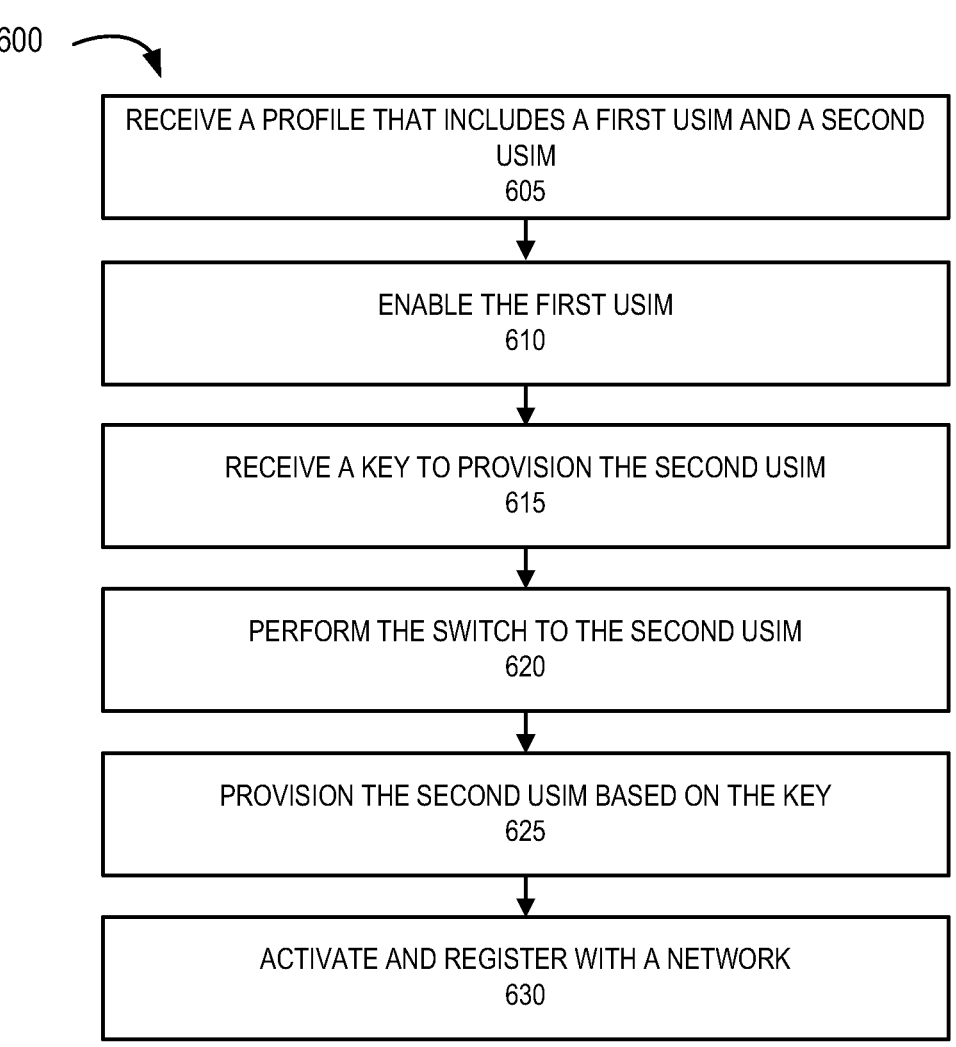
FIG. 6 is a flow diagram illustrating another exemplary process of an exemplary embodiment of the security service of end device profiles.

FIG. 6 is a flow diagram illustrating another exemplary process 600 of an exemplary embodiment of the security service of end device profiles. According to an exemplary embodiment, end device 130 and/or card logic may perform a step of process 600. According to an exemplary implementation, processor 410 executes software 420 to perform the step of process 600, as described herein. Alternatively, the step may be performed by execution of only hardware. In this way, end device 130 and/or the card logic may be configured to perform a step of process 600.

Referring to FIG. 6, in block 605, end device 130 may obtain a profile that includes a first USIM and a second USIM. For example, end device 130 may download the profile, which includes a first executable element, such as the first USIM or the like, and a second executable element, such as the second USIM or the like, as described herein, from a third party device, such as third party subscription management device 201. The profile includes other elements, such as subscription management information, and so forth.

In block 610, the card logic of end device 130, as described herein, may install or enable the first USIM. For example, end device 130 may select the first USIM for use and obtain an identifier from the first USIM, as described herein. The first USIM may perform an authentication and security procedure.

In block 615, the card logic may receive a key to provision the second USIM. For example, the first USIM may receive the key from OTA device 206. The key may include a decryption key, for example.

In block 620, the card logic may perform a switching procedure to the second USIM. For example, the first USIM may update (e.g., change the order, disable, delete) an AID of the first USIM, and enable the second USIM for prospective selection and use by end device 130.

In block 625, the card logic may provision the second USIM based on the key. The first USIM may provision or make available the key to the second USIM and enable the second USIM to decrypt encrypted data and perform provisioning.

In block 630, the card logic may be activated and register with a network. For example, end device 130 may select and use the second USIM. The second USIM of end device 130 may be activated or register with network 102, which may include a core network.

FIG. 6 illustrates an exemplary embodiment of a process of the security service of end device profiles, according to other exemplary embodiments, the security service of end device profiles may perform additional operations, fewer operations, and/or different operations than those illustrated and described. For example, one or multiple steps illustrated and described in relation to FIGS. 2A and 2B may be performed.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out"

processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
installing, by an end device on to a card, a single profile obtained from a third party device, wherein the profile includes a first Universal Subscriber Identity Module (USIM) and a second USIM;
switching, by the end device and the first USIM, from a use of the first USIM to a use of the second USIM;
provisioning, by the end device and the second USIM, the second USIM based on a key generated by the first USIM; and
registering, by the end device and the second USIM, the second USIM of the end device with a core network.

2. The method of claim 1, further comprising:
generating, by the end device and the first USIM, the key based on an identifier of the card.

3. The method of claim 1, further comprising:
receiving, by the first USIM, a decryption key; and
storing, by the first USIM on the second USIM, the decryption key.

4. The method of claim 1, further comprising:
authenticating, by the end device and the first USIM before the switching, the first USIM with an authentication device.

5. The method of claim 1, wherein the switching further comprises:
deleting, by the end device and the first USIM, an application identifier of the first USIM.

6. The method of claim 1, further comprising:
determining, by the end device and the second USIM before the provisioning, that the second USIM is unable to authenticate with an authentication device.

7. The method of claim 1, further comprising:
performing, by the end device and the second USIM after the provisioning, an initialization procedure at the end device.

8. The method of claim 1, wherein the card includes a Subscriber Identity Module (SIM) card or a Universal Integrated Circuit Card (UICC).

9. A device comprising:
a processor configured to:
install a single profile obtained from a third party device on to a card, wherein the profile includes a first Universal Subscriber Identity Module (USIM) and a second USIM;
switch from a use of the first USIM to a use of the second USIM;

provision the second USIM based on a key generated by the first USIM; and
register the second USIM of the device with a core network.

10. The device of claim 9, wherein the processor is further configured to:
generate the key based on an identifier of the card and the first USIM.

11. The device of claim 9, wherein the processor is further configured to:
receive, by the first USIM, a decryption key; and
store, by the first USIM on the second USIM, the decryption key.

12. The device of claim 9, wherein the processor is further configured to:
authenticate, before the switching, the first USIM with an authentication device.

13. The device of claim 9, wherein, when switching, the processor is further configured to:
delete, by the first USIM, an application identifier of the first USIM.

14. The device of claim 9, wherein the processor is further configured to:
determine before the provisioning, that the second USIM is unable to authenticate with an authentication device.

15. The device of claim 9, wherein the processor is further configured to:
perform after the provisioning, an initialization procedure at the device.

16. The device of claim 9, wherein the card includes a Subscriber Identity Module (SIM) card or a Universal Integrated Circuit Card (UICC).

17. A non-transitory computer-readable storage medium storing instructions executable by a processor of a device, wherein the instructions are configured to:
install a single profile obtained from a third party device on to a card, wherein the profile includes a first Universal Subscriber Identity Module (USIM) and a second USIM;
switch from a use of the first USIM to a use of the second USIM;
provision the second USIM based on a key generated by the first USIM; and
register the second USIM of the device with a core network.

18. The non-transitory computer-readable storage medium of claim 17, wherein the instructions are further configured to:
delete, by the first USIM, an application identifier of the first USIM.

19. The non-transitory computer-readable storage medium of claim 17, wherein the instructions are further configured to:
generate the key based on an identifier of the card and the first USIM.

20. The non-transitory computer-readable storage medium of claim 17, wherein the card includes a Subscriber Identity Module (SIM) card or a Universal Integrated Circuit Card (UICC).

* * * * *